United States Patent [19]

Grant et al.

[11] Patent Number: 5,670,845
[45] Date of Patent: Sep. 23, 1997

[54] VEHICLE ELECTRONIC CONTROL APPARATUS

[75] Inventors: Philip Grant, Crewe; Michael Christopher Becker, Stoke-on-Trent; David Brassington; Philip Samuel Butler, both of Crewe; Steven Graham Hutson; Nicholas Jonathan Fullalove, both of Cheshire; Leslie Douglas Preston, Crewe, all of United Kingdom

[73] Assignee: Rolls-Royce Motor Cars Limited, London, England

[21] Appl. No.: 318,636

[22] PCT Filed: Apr. 6, 1993

[86] PCT No.: PCT/GB93/00723

§ 371 Date: Aug. 3, 1995

§ 102(e) Date: Aug. 3, 1995

[87] PCT Pub. No.: WO93/21035

PCT Pub. Date: Oct. 28, 1993

[30] Foreign Application Priority Data

Apr. 10, 1992 [GB] United Kingdom ............... 9207909

[51] Int. Cl.$^6$ .................................................. B60Q 1/26
[52] U.S. Cl. ...................... 315/77; 315/80; 364/431.12; 364/431.04; 307/10.1
[58] Field of Search ................... 315/77, 80, 82; 364/431.12, 431.04, 492; 307/10.1, 10.8

[56] References Cited

U.S. PATENT DOCUMENTS

| | | | |
|---|---|---|---|
| 4,293,947 | 10/1981 | Brittain | 370/89 |
| 4,682,294 | 7/1987 | Duc et al. | 364/492 |
| 4,760,275 | 7/1988 | Sato et al. | 307/10 R |
| 4,942,571 | 7/1990 | Möller et al. | 307/10.1 X |
| 5,121,386 | 6/1992 | Wolfsgruber et al. | 370/85.1 |
| 5,247,446 | 9/1993 | Motz et al. | 364/431.12 |

FOREIGN PATENT DOCUMENTS

| | | |
|---|---|---|
| 0138710 | 4/1985 | European Pat. Off. . |
| 0289271 | 11/1988 | European Pat. Off. . |
| 0307344 | 3/1989 | European Pat. Off. . |
| 0396090 | 11/1990 | European Pat. Off. . |
| 0402732 | 12/1990 | European Pat. Off. . |
| 0406718 | 1/1991 | European Pat. Off. . |
| 0470056 | 2/1992 | European Pat. Off. . |

*Primary Examiner*—Robert Pascal
*Assistant Examiner*—Haissa Philogene
*Attorney, Agent, or Firm*—Cushman Darby & Cushman IP Group of Pillsbury Madison & Sutro LLP

[57] ABSTRACT

Apparatus for controlling the electrical functions in a plurality of different locations of a vehicle comprises a plurality of electrical control units connected to a data bus (23) and distributed throughout the vehicle. All control units are identical and all are programmed to carry out all the electrical functions of the vehicle. Each unit incorporates means to detect the resistance at the point at which it is connected into the circuitry and to compare that resistance with the stored table of resistance and to select on the basis of that comparison the program for operation appropriate to the particular location in which the unit is disposed. In this way only one unit needs to be certified and units may be switched from location to location to provide a "get you home" service should one of the units fail in a particularly critical location.

8 Claims, 3 Drawing Sheets

VEHICLE ELECTRONIC CONTROL APPARATUS

FIELD OF THE INVENTION

The present invention relates to electronic control systems for vehicles.

BACKGROUND OF THE INVENTION

Modern day vehicles are electrically extremely complex. This demand for complexity has led to an ever increasing complexity of the vehicle wiring harness through which the electrical equipment of the vehicles are powered and controlled. It has been proposed to supply each item of electrical equipment via an intelligent control unit. In accordance with that proposal each control unit would be specifically tailored to the particular associated item of equipment. Whilst such an arrangement appears superficially to afford the most economic and technically satisfactory solution, on closer analysis this may not in fact be the case. Tailoring control units to specific tasks involves more certification and increased development costs. Current European and International certification requirements for electronic circuitry for vehicles are set out in 72/245/EEC, ECE 10 and CSA C108A. This certification procedure includes testing a particular unit for electromagnetic compatibility. If, following the certification of a particular unit, that unit is changed either by altering its hardware or its software, the unit must be recertified. This recertification involves considerable further costs which are additional to the development costs inherent in the change. Furthermore, tailoring control units to specific tasks inevitably means that units cannot be interchanged. This reduces manufacturing flexibility and ability to provide an immediate temporary solution in an emergency, for example, by replacing a faulty unit in a priority position by a satisfactory working unit provided as a spare or from a non-priority position.

SUMMARY OF THE INVENTION

According to the present invention there is provided apparatus for controlling the electrical functions in a plurality of different locations of a vehicle comprising a plurality of electronic control units each of which is disposed to control electrical function(s) in a particular one of those locations, and a plurality of activation devices disposed to feed control signals to one or more of the units under the control of a vehicle occupant wherein the control units are all identical and are programmed to control all the functions in all the locations and comprise means for identifying which program to activate in dependence upon the particular location of the unit whereby one unit may be substituted for another where necessary.

In a preferred embodiment of the invention relating to an automobile, electronic control units are provided to respectively control individual front left and right and rear lamp clusters. Further units control an alarm windscreen wipers, door locks and window lifts, the seats and mirrors. Each unit comprises input for receiving signals from the corresponding activation device such as a switch and outputs for feeding electric current to the devices to be controlled. Inputs are provided for receiving electronic messages from other units. Circuitry is also provided for activating the unit from a normally quiescent state. Each unit comprises an EPROM for storing programs for all the functions which the unit will be called upon to carry out so that the unit can be employed in any position in the automobile and an E²PROM for storing data which is to be retained when the unit is disconnected or off. The means for determining which program to activate comprises a detector for detecting the resistance at the point in the circuit when the unit is plugged in and comparing this with a table of resistances in the unit.

BRIEF DESCRIPTION OF THE DRAWINGS

In order that the invention may be more clearly understood, one embodiment thereof will now be described, by way of example with reference to the accompanying drawings, in which.

DETAILED DESCRIPTION OF THE INVENTION

Figure 1:
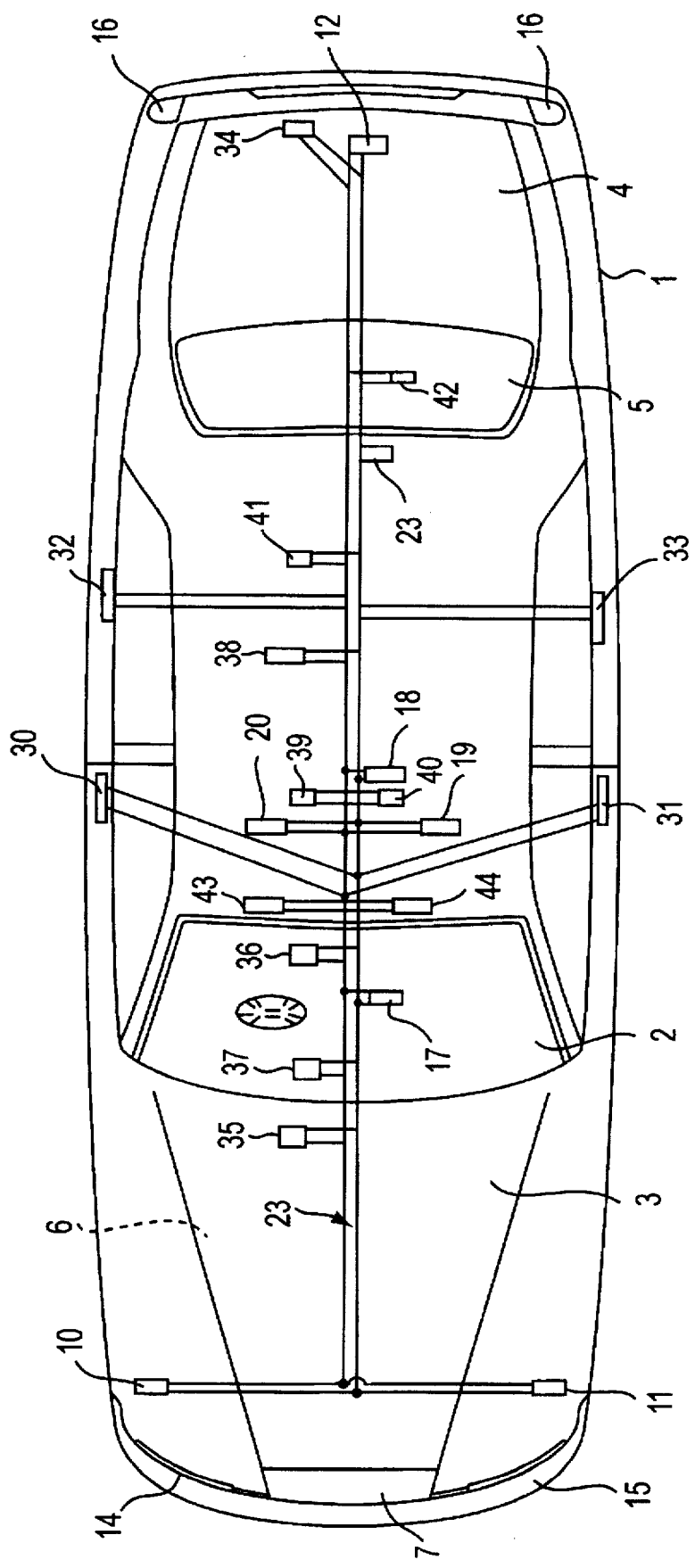
FIG. 1 diagrammatically shows a vehicle incorporating an electronic control system according to the invention, FIG. 2 diagrammatically shows a unit forming part of the system of FIG. 1 for controlling certain vehicle lights, and FIG. 3 diagrammatically shows the same unit forming part of the system of FIG. 1 for controlling the electrical functions of the drivers door.

Referring to FIG. 1, the electrical installation of an automobile is diagrammatically shown in plan view. The outline of the automobile is referenced 1, the windscreen 2, bonnet 3, boot 4, rear window 5, engine 6 and radiator 7. A plurality of electronic control units are connected to a data bus 23 and are distributed throughout the automobile for controlling the various items of electrical equipment installed in the automobile other than the engine management system gearbox, suspension, brakes or steering. Electronic control units 10, 11 and 12 and are provided for controlling front right, front left, rear lamp clusters 14, 15 and 16 respectively. Control unit 17 is connected to a light switch 19 which is disposed within easy reach of the car driver. When the light switch is depressed the control unit 17 will detect this and transmit a digitally encoded data message via data bus 23 to units 10, 11 and 12, instructing these units to energize the respective outputs and switch on its lights. When applied to other lights and accessories the principle is the same, messages being sent over the data bus 23. This drastically reduces the complexity of the vehicle's wiring loom.

Figure 2:
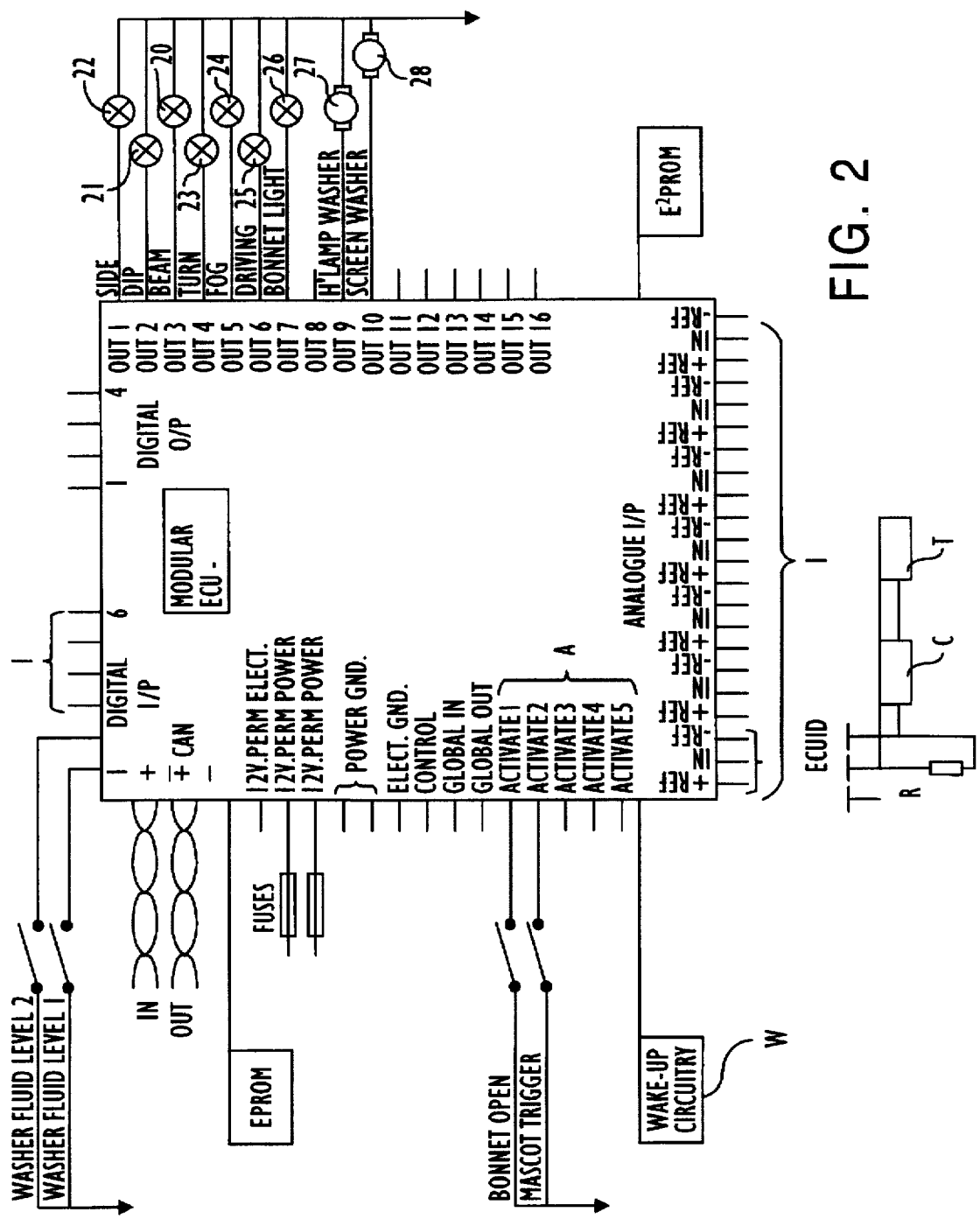

The electronic control unit connections for the left front light cluster 11 is shown in more detail in FIG. 2. The unit comprises a series of eighteen input pins I, covering both analogue and digital signals. Signals for operating the lights controlled by this unit are fed to the unit from the control unit 17 via the in/out controller area network (CAN) bus pins. The outputs to the lights are fed via a series of output devices. These devices control the operation of the headlamp, side lamp turning indicator lamp and other lamps. These comprise headlamp filaments 20 and 21, side lamp filament 22, indicator lamp filament, fog lamp filament 24, driving lamp filament 25 and bonnet light filament 26. Each unit comprises an identity section having an input ECUID which enables the unit to "read" the resistance at the location at which it is plugged into the circuit and compare that resistance with a table of resistances stored in the unit and from that comparison chose the appropriate software to run for that location. The resistances in the table correspond to those at the different locations of the units throughout the vehicle. Each unit is powered from the 12 volt vehicle supply and also comprises circuitry to enable the unit to enter a quiescent state and only to power up on receipt of an activate signal. The inputs to this circuitry are referenced A.

In addition to units for controlling the lights, electronic control units are also provide for controlling the electric window lift and the lock of each of four doors. These are referenced 30, 31, 32 and 33 respectively. Electronic control unit 34 is provided for controlling the boot lock, electronic control unit 35 is provided for controlling the windscreen wiper, unit 36 for an alarm, unit 37 for the front heating, ventilating and air-conditioning, unit 38 for the rear heating, ventilating and air-conditioning, units 39 and 40 for the front seats and units 41 and 42 for the rear seats. All units receive operating signals from appropriate activation devices such as switches or keys but for simplicity not all such devices have been shown. The driver's seat and door control switches 43 and the front passenger seat and door control switches 44 are shown by way of example.

All of the electronic units are identical. This means that any unit can be exchanged for any other unit. Thus a unit in a non-priority position may be exchanged for a faulty unit in a priority position as a temporary "get you home" measure. As all the units are the same only one certification is required. Furthermore, although for certain applications the units will be more complex than is necessary this is considered to be justified by the saving in manufacturing development and certification costs resulting from the single unit approach. Each unit contains an EPROM programmed to carry out all the tasks which the unit will be called upon to perform in all of the situations in which it can be used, and an E²PROM for storing data to be retained when the unit is disconnected or off.

Figure 3:
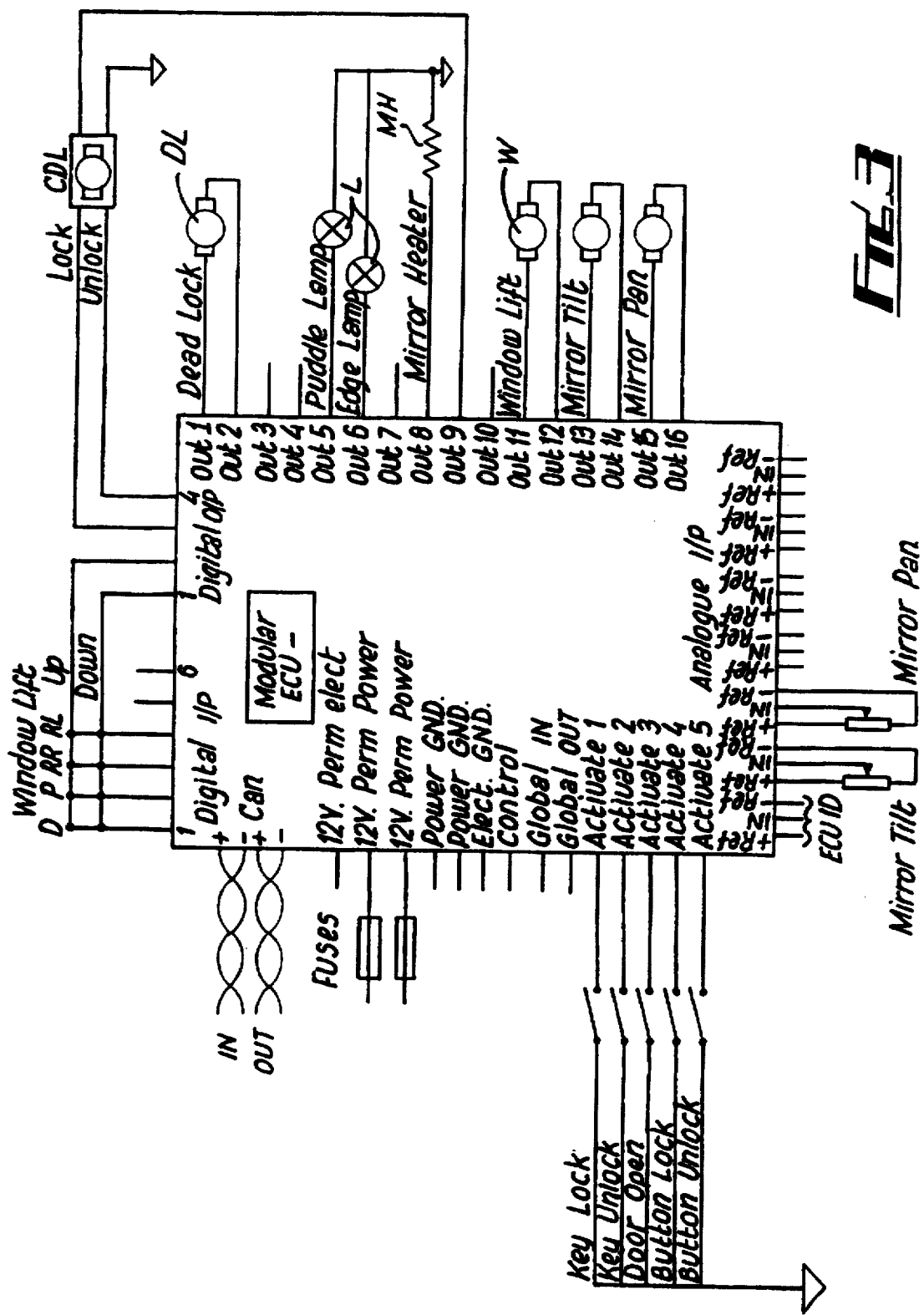

FIG. 3 shows a unit which is identical to the unit of FIG. 2 but demonstrating the connections for unit use to control all the electrical functions of the automobile driver's door. The unit is therefore connected to all electrical accessories within the door. Output devices control the doorlock L, the door deadlock DL, the windowlift W, the mirror heater MH and the lights L. Input signals are received from windowlock lift switches WS. When an input is activated, for example for a window lift, the unit will activate its respective output device to energize the window lift.

Any unit may also receive a digitally encoded message along data bus 23 from any other unit to signify that a switch has been pressed in some other location of the vehicle. For example, if a switch for a doorlock is pressed to activate that lock through its local electronic control unit, that unit may signal other electronic control units to activate the other door locks and the boot lock.

It will be appreciated that the above embodiment has been described by way of example only and that many variations are possible without departing from the scope of the invention.

We claim:

1. Apparatus for controlling the electrical functions in a plurality of different locations of a vehicle, comprising a plurality of electronic control units, each of which is operable to control at least one electrical function in a particular one of those locations, and a plurality of activation devices disposed to feed control signals to one or more of the units under the control of a vehicle occupant wherein the control units are all identical and include programs to control all the functions in all the locations of the vehicle and comprise means for identifying which program to activate in dependence upon the particular location of the unit whereby one unit may be substituted for another where necessary.

2. Apparatus as claimed in claim 1, in which electronic control units are provided for respectively controlling front left, front right and rear lamp clusters.

3. Apparatus as claimed in claim 1, in which each unit comprises one or more inputs for receiving signals from one or more activation devices, and output for feeding current to devices to be controlled.

4. Apparatus as claimed in claim 3, in which one or more of the activation devices comprises a switch.

5. Apparatus as claimed in claim 1, in which each unit comprises circuitry for activating the unit from a normally quiescent state.

6. Apparatus as claimed in claim 1, in which each unit comprises an EPROM for storing all the programs to control all the functions.

7. Apparatus as claimed in claim 1 in which each unit comprises an E2PROM for storing data which is to be retained when the unit is disconnected or off.

8. Apparatus for controlling the electrical functions in a plurality of different locations of a vehicle, comprising a plurality of electronic control units, each of which is operable to control at least one function in a particular one of those locations, and a plurality of activation devices disposed to feed control signals to one or more of the units under the control of a vehicle occupant and wherein the control units are all identical and include programs to control all the functions in all the locations of the vehicle and include means for identifying which program to activate in dependence upon the particular location of the unit whereby one unit may be substituted for another where necessary, and in which each control unit includes a circuit having a resistance and the means for identifying comprises a comparator for comparing the resistance of the circuit at the location of the unit with a table of resistances stored in the unit.

* * * * *